US007232600B2

(12) United States Patent
Misuda

(10) Patent No.: US 7,232,600 B2
(45) Date of Patent: Jun. 19, 2007

(54) RECORDING MEDIUM, IMAGE-FORMING METHOD EMPLOYING THE SAME, PROCESS FOR PRODUCING THE SAME

(75) Inventor: Katsutoshi Misuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 809 days.

(21) Appl. No.: 10/080,672

(22) Filed: Feb. 25, 2002

(65) Prior Publication Data

US 2002/0160161 A1 Oct. 31, 2002

(30) Foreign Application Priority Data

Feb. 28, 2001 (JP) ............................ 2001-054585

(51) Int. Cl.
*B32B 3/00* (2006.01)
*B41M 5/00* (2006.01)
*B41M 5/40* (2006.01)

(52) U.S. Cl. ............... 428/195.1; 428/32.3; 428/32.33; 428/32.34; 428/206; 428/328; 428/688

(58) Field of Classification Search ................ 428/195, 428/213, 328, 688, 32.21, 195.1, 32.3, 32.33, 428/32.34, 206

See application file for complete search history.

(56) References Cited

U.S. PATENT DOCUMENTS

| | | | | |
|---|---|---|---|---|
| 4,202,870 | A | 5/1980 | Weber et al. | 423/630 |
| 4,242,271 | A | 12/1980 | Weber et al. | 260/448 AD |
| 4,248,852 | A | 2/1981 | Wakabayashi et al. | 423/626 |
| 5,171,626 | A | 12/1992 | Nagamine et al. | 428/212 |
| 5,635,291 | A | 6/1997 | Yoshino et al. | 428/304.4 |
| 5,707,716 | A | 1/1998 | Yoshino et al. | 428/212 |
| 5,955,142 | A | 9/1999 | Yoshino et al. | 427/205 |
| 5,955,185 | A | 9/1999 | Yoshino et al. | 428/304.4 |
| 6,177,188 | B1 * | 1/2001 | Ichioka et al. | 428/32.2 |
| 6,200,670 | B1 | 3/2001 | Hosoi et al. | 428/212 |
| 6,203,899 | B1 * | 3/2001 | Hirose et al. | 428/32.25 |
| 6,502,935 | B1 * | 1/2003 | Barcock et al. | 347/105 |

FOREIGN PATENT DOCUMENTS

| | | | |
|---|---|---|---|
| CA | 1 272 430 | | 11/2000 |
| EP | 0 663 300 | A1 | 7/1995 |
| EP | 0 934 905 | A2 | 8/1999 |
| EP | 1 048 480 | A1 | 11/2000 |
| JP | 52-9074 | A | 1/1977 |
| JP | 56-157 | A | 1/1981 |
| JP | 57-44605 | B2 | 9/1982 |
| JP | 55-51583 | A | 4/1983 |
| JP | 63-22997 | A | 1/1988 |
| JP | 2-276670 | A | 11/1990 |
| JP | 6-79967 | A | 3/1994 |
| JP | 7-232473 | A | 9/1995 |
| JP | 9-66664 | A | 3/1997 |
| JP | 9-99627 | A | 4/1997 |
| JP | 2686670 | A | 8/1997 |
| JP | 10-95754 | A | 4/1998 |
| JP | 11-1060 | A | 1/1999 |
| JP | 11-286171 | A | 10/1999 |
| JP | 2001-10222 | A | 1/2001 |

OTHER PUBLICATIONS

Roček, et al., Institute of Chemical Process Fundamentals, Czechoslovak Academy of Sciences, "Effect of Precipitation and Aging on Porous Structure of Aluminum Hydroxide. I. Statistical Treatment of Experimental Data", Collect. Czech. Chem. Commun., (vol. 56), (1991), pp. 1253-1262.

* cited by examiner

*Primary Examiner*—Rena Dye
*Assistant Examiner*—Lawrence Ferguson
(74) *Attorney, Agent, or Firm*—Fitzpatrick, Cella, Harper & Scinto

(57) ABSTRACT

An ink-jet recording medium having at least a light-reflecting layer and a dye-fixing layer formed in this order on a base material in a multilayer structure, wherein the light-reflecting layer contains two or more pigments different in chemical composition, and wherein the average particle size of a pigment (A) having a highest liquid absorbency in the pigments is smaller than the average particle size of a pigment (B) having a lowest liquid absorbency in the pigments.

6 Claims, No Drawings

RECORDING MEDIUM, IMAGE-FORMING METHOD EMPLOYING THE SAME, PROCESS FOR PRODUCING THE SAME

BACKGROUND OF THE INVENTION

1. Field of the Invention

The present invention relates to a recording medium for formation of a print having texture and image quality comparable to silver salt photographs by application of droplets of a recording liquid such as an ink, especially a recording medium suitable for image formation by ink-jet recording. The present invention also relates to a process for producing the recording medium, and an image-forming method employing the recording medium.

2. Related Background Art

The ink-jet recording method conducts recording by projecting fine droplets of a recording liquid such as an ink to deposit the droplets onto a paper sheet or a like recording medium to record an image or letters. The ink-jet recording method has advantages of high printing speed, low noise generation, ease of multicolor printing, flexibility of the recording pattern, needlessness of image development, and so forth. Therefore, the ink-jet recording methods and apparatuses are being developed and becoming widespread not only as printers but also as output devices of information apparatuses such as copying machines, word processors, and plotters. Recently, digital cameras, digital videos, scanners, and the like of high-performance are commercialized at low prices. As the results of the widespread use of the above apparatuses and popularization of personal computers, ink-jet type printers have come to be used suitably. Under such a background, the ink-jet recording is demanded which is capable of readily outputting images comparable to the multicolor print images formed by silver salt photography or gravure printing.

To meet such needs, the structure of the printer and the method of the recording are being improved for higher printing speed, higher fineness of the printed image, and full color printing. The recording medium used therefor is also being improved in terms of the properties and characteristics thereof.

Various ink-jet recording mediums are disclosed hitherto. For example, Japanese Patent Application Laid-Open No. 52-9074 discloses a recording medium having an ink-receiving layer containing a silica type pigment having a large specific surface area as the main components and having voids to improve the ink absorbing rate. Japanese Patent Application Laid-Open No. 63-22997 discloses a recording medium having adjusted voids in the pigment layer for constituting an ink-receiving layer. Japanese Patent Application Laid-Open Nos. 55-51583 and 56-157 disclose incorporation of powdery amorphous silica into the ink-receiving layer to increase the ink absorbency of the ink-receiving layer to obtain printed dots with high printing density without ink running.

Alumina hydrate is attracting attention in recent years as the material for constituting the ink-receiving portion of the recording medium. This is because the alumina hydrate, which is in a state of fine particles having a positive charge, is capable of fixing the dye of the ink and forming a transparent layer to give images with high color-developability and high water resistance. Such recording mediums are disclosed, for example, in Japanese patent Application Laid-Open Nos. 7-232473, 9-66664, and 2-276670. Japanese Patent Application Laid-Open Nos. 9-99627, and 11-286171 disclose respectively a recording medium having an ink-receiving layer constituted of alumina hydrate particles having a specified crystal thickness, or a specified pore structure. Japanese Patent Application Laid-Open No. 10-95754 discloses a recording medium having an ink-receiving layer mainly composed of aggregate of particles of alumina hydrate formed on a paper base such as a wood-free paper sheet other than a plastic film.

Japanese Patent Application Laid-Open No. 11-1060 discloses a recording medium which has an ink-receiving layer constituted of a porous layer containing barium sulfate and a layer containing nonoriented alumina hydrate provided in this order on a base material to raise the ink absorption rate and prevent beading and to achieve excellent print quality. Japanese Patent Application Laid-Open No. 6-79967 discloses a recording medium having a cast-treated layer containing alumina hydrate to achieve simultaneously high ink absorbency and high glossiness of prints. Japanese Patent No. 2686670 discloses a recording medium which has an ink-receiving layer constituted of two layers to achieve higher image density: an upper layer being mainly composed of aluminum oxide having a larger specific surface area and a lower layer being mainly composed of a pigment having a smaller specific surface area. Japanese Patent Application Laid-Open No. 2001-10222 discloses a recording medium which has a lower layer containing barium sulfate and another pigment formed on a supporting member and an upper layer containing aluminum oxide as the main pigment formed thereon.

Various methods are disclosed which improve the recording medium for higher ink absorbency for high printing speed of printers without lowering the high image density. For example, an ink-receiving layer is formed with a pigment having a large pore volume to increase the void volume for absorbing and retaining the ink. Otherwise, an ink-receiving layer is formed from an ink-absorbent polymer material. However, such an ink-receiving layer may give rise to white turbidity of the dots by irregular light reflection or other causes not to give desired high image density or high glossiness. Increase of the coating thickness of the ink-receiving layer for higher ink absorbency will increase the cost of the material and production process.

The glossy recording medium having a paper base material involves a problem of waving of the recording face after ink-jet recording to lower the glossiness. The constitution having a barium-sulfate-containing layer disclosed in the aforementioned Japanese Patent Application Laid-Open No. 11-1060, which can prevent the waving to a certain extent, needs an additional thick ink-receiving layer thereon in order to obtain sufficient ink-absorbency owing to the less ink-absorbency of the barium-sulfate-containing layer.

Still higher surface glossiness is required for obtaining a printed matter comparable to silver salt type photographs. The constitution of the layer containing barium sulfate and another pigment formed on a supporting member disclosed in Japanese Patent Application Laid-Open No. 2001-010222 is still unsatisfactory in surface gloss or other properties.

SUMMARY OF THE INVENTION

The present invention intends to provide a recording medium having excellent surface gloss, giving a sufficiently high image density of the print, and having high ink-absorbency, at a low cost. The present invention intends also to provide a recording medium which does not cause slippage or waviness.

The recording medium of the present invention provides a recording medium having at least a light-reflecting layer and a dye-fixing layer formed in the named order on a base material in a multilayer structure, wherein the light-reflecting layer contains two or more pigments different in chemical composition, and wherein the average particle size of a pigment (A) having a highest liquid absorbency in the pigments is smaller than the average particle size of a pigment (B) having a lowest liquid absorbency in the pigments.

The method of image formation of the present invention comprises conducting recording on a recording medium having the above-mentioned constitution by an ink-jet recording system.

The process for producing the recording medium of the present invention having at least a light-reflecting layer and a dye-fixing layer formed in the named order on a base material in a multilayer structure comprises applying a first coating liquid containing two or more pigments different in chemical composition onto a base material to form a light-reflecting layer, applying a second coating liquid containing alumina hydrate particles onto the light-reflecting layer to form a dye-fixing layer, and swelling the dye-fixing layer followed by pressing a surface thereof against a heated smooth face to conduct drying treatment.

DETAILED DESCRIPTION OF THE PREFERRED EMBODIMENTS

The recording medium of the present invention has at least a light-reflecting layer and a dye-fixing layer formed in the named order on a base material in a multilayer structure, the light-reflecting layer containing at least two pigments (A) and (B) different in chemical composition.

The pigment (A) has preferably an average particle size of not more than 1 μm, and the pigment (B) has an average particle size ranging preferably from 0.5 to 10 μm: more preferably the pigment (A) has an average particle size of not more than 0.5 μm, and the pigment (B) has an average particle size ranging from 0.5 to 5 μm.

The light-reflecting layer of the recording medium of the present invention is preferably formed directly on a fibrous base material.

The pigment (A) is preferably selected from aluminum pigments.

The pigment (B) may be barium sulfate. The pigment (B) has a refractive index of preferably not less than 1.6.

The dye-fixing layer contains particles of alumina hydrate preferably with a content not lower than 70 mass %. The dye-fixing layer forms the recording face having a 20°-gloss of preferably not less than 20%.

The preferred combination of the pigment (A) and the pigment (B) includes a combination of an aluminum pigment as the pigment (A) and barium sulfate as the pigment (B), and a combination of an aluminum pigment as the pigment (A) and a silica type pigment as the pigment (B).

The present invention enables production of a recording medium which gives a very high image density of the print, having high and rapid ink-absorbency, and causing no deterioration of glossiness of the paper sheet surface after printing, at a low production cost. Simultaneously the present invention enables shortening of the time for stabilization of the color after printing.

The present invention enables formation of an image having a very high image density comparable to silver salt type photographs in texture and image quality. The present invention enables also formation of a fine and high-quality print comparable to silver salt type photographs in texture and image quality by simple and high-speed process by selecting the input system such as a digital camera or the like and employing an ink-jet recording system as the output system.

The recording medium provided by the present invention does not cause slippage or waviness of the surface of the recording medium.

Presumably, the effects of the present invention are achieved by the mechanism below. The recording liquid deposited on the dye-fixing layer surface penetrates into the recording medium, and during the penetration the dye is adsorbed by the dye-fixing layer near the surface, so that the solvent separates and penetrates into the lower layer. The light-reflecting layer is placed between the fibrous base material and the dye-fixing layer, and serves to receive the penetrating solvent and also serves to reflect and diffuse the incident light introduced into the transparent dye-fixing layer at the interface between the dye-fixing layer and the light-reflecting layer. The higher reflectivity at the interface will result in higher whiteness of the recording medium and higher image density.

The inventors of the present invention have eventually arrived at the recording medium of the present invention in the course of investigation on the constitution for achieving higher ink absorbency at a lower cost without causing deterioration of the glossiness of the printed portion. The light-reflecting layer of the recording medium of the present invention contains a first pigment having a larger particle size which causes less change in the shape thereof by moisture absorption, and a second pigment having a smaller particle size and having higher ink absorbency. Thereby, the light-reflecting layer attains a high liquid absorbency with retention of high light diffusibility and light reflectivity. The recording medium has the high ink absorbency suitable for a photoprinting system, and also enables decrease of the thickness of the dye-fixing layer formed on the light-reflecting layer. Further the dye and the solvent can be separated rapidly in the recording medium, which shortens the time for stabilization of the printed color with retention of the high image density.

The reflecting layer of the recording medium of the present invention becomes denser and has a higher surface flatness. This improves the uniformity and surface glossiness of the dye-fixing layer formed thereon. The reflecting layer has improved ink (solvent) absorbency and improved ink (solvent) retainability, retarding penetration of the solvent into the fibrous base material, thereby preventing waving of the recording medium surface caused by swelling of the fibrous base material. By the same reason, when the casting by re-wetting is combinedly employed, the structure prevents the swelling on re-wetting to enable more efficient treatment to achieve a highest glossiness which has not ever been achieved.

Thus, the recording medium of the present invention gives high image density and high glossiness by retaining the high liquid absorbency without causing decrease of the glossiness owing to slippage or waving of the recording paper sheet after recording.

The base material material for the recording medium of the present invention includes those material composed mainly of wood pulp and a filler such as sized paper sheets and non-sized paper sheets. The fibrous base material has a basis weight of preferably not less than 120 $g/m^2$, more preferably in the range from 150 to 180 $g/m^2$, and a Stöckigt sizing degree of preferably not less than 100 seconds, more preferably not less than 200 seconds. Such a fibrous base material can give a recording medium having high-quality feeling even in an A4 or A3 size.

The reflecting layer formed on the fibrous base material in the present invention comprises at least two pigments different in chemical composition. The present invention is firstly characterized by the reflecting layer containing at least a pigment (A) having a higher liquid absorbency of the pigment particles, and a pigment (B) having a lower liquid absorbency of the pigment particles, the pigment (A) having an average particle size smaller than that of the pigment (B).

The liquid absorbency herein means the capacity of the particles per se to absorb a liquid such as water and inks, which can be expressed as an oil absorption. The oil absorption can be measured by a method described in JIS-K-5101. In the present invention, the pigment (A) preferably has an oil absorption of not less than 100 mL/100 g, more preferably not less than 200 mL/100 g, and the pigment (B) preferably has an oil absorption of not more than 100 mL/100 g, more preferably not more than 50 mL/100 g.

Of the two kinds of the pigments, the pigment (B) preferably has an average particle size ranging preferably from 0.5 to 10 μm, more preferably from 0.5 to 5 μm, still more preferably from 0.5 to 3 μm. The average particle size of the pigment (B) in the above range enhances the effect of combination with the pigment (A), giving the higher surface smoothness and the surface gloss after printing of the recording medium, improving further the light diffusion to raise the reflection effect and the image density.

The pigment (A), on the other hand, preferably has an average particle size preferably not larger than 1 μm, more preferably not larger than 0.5 μm, still more preferably not larger than 0.3 μm.

The ratio of the pigment (A) to the pigment (B) employed ranges preferably from 9:1 to 3:7 (mass ratio). The pigment (B) is contained in the reflecting layer with a content ranging preferably from 10 to 70 mass %. Within this content range, the effect of combination with the pigment (A) is further enhanced.

The pigment (B) may be a conventional white pigment. The white pigment includes silica, kaoline, clay, barium sulfate, calcium carbonate, and aluminum oxide, but is not specifically limited thereto, provided that the pigment enables formation of a layer having properties of light diffusion and light reflection. The pigment (B) preferably has a refractive index of not less than 1.6 for the higher reflectivity. Of the above pigments, barium sulfate is preferred. The barium sulfate used as the pigment (B) gives higher image density owing to sufficiently high reflectivity of the reflecting layer resulting from the high whiteness and high refractivity thereof. The refractivity index of the powdery pigment can be measured by a conventional method. Generally for the measurement, several liquids are prepared which are different in the refractive index, and the particles are immersed in the liquids to measure the refractive index. Use of silica which has higher ink absorbency than barium sulfate enables decrease of thickness of the dye-fixing layer.

The pigment (A) may be selected from the aforementioned white pigments and the like, but is not specifically limited thereto, provided that the pigment has sufficient liquid absorbency. Of these pigments, particularly preferred are aluminum pigments: specifically alumina hydrate, and γ-type crystalline alumina particles which will be exemplified later as the constituting material of the dye-fixing layer. Such particulate materials are particularly preferred in combination with barium sulfate or silica in improving the ink absorbency and preventing waving of the recorded portion.

The reflecting layer may contain a third pigment in addition to the pigments (A) and (B) at a content not to lessen the effects thereof. This third pigment should have a liquid absorbency lower than that of pigment (A) but higher than that of the pigment (B).

For binding the pigments, a binder may be used which has a binding ability within an amount not to lessen the effects of the present invention without specific limitation. The binder includes polyvinyl alcohols, polyvinyl acetate, oxidized starch, etherified starch, casein, gelatin, soybean protein, and synthetic polymers such as styrene-butadiene type latexes, polyvinyl acetate, polyacrylate esters, polyesters, and polyurethanes. The ratio of the total weight of the pigments to the binder blended in the reflecting layer ranges preferably from 10:0.7 to 10:10, more preferably from 10:5 to 10:1 in terms of a mass ratio.

As the binder for barium sulfate, gelatin is the most suitable of the above-mentioned binders. The gelatin may be any modified gelatin including acid-treated gelatins, and alkali-treated gelatins. The gelatin is used in an amount ranging preferably from 6 to 12 mass parts with respect to 100 mass parts of the barium sulfate. With the gelatin, a gelatin crosslinking agent may be used, if necessary, the crosslinking agent including chromium sulfate, chromium alum, formalin, and triazine. The amount of the crosslinking agent ranges preferably from 0.2 to 4 mass parts with respect to 100 mass parts of gelatin. Of the crosslinking agents, chromium alum is preferred in view of ease of handling.

The reflecting layer can be formed by applying a coating liquid, which has been prepared by dispersing the pigments and optionally a binder in water or a suitable solvent, on the face of the aforementioned fibrous base material, and subsequently drying the applied coating layer.

The coating weight of the reflecting layer ranges preferably from 15 to 30 $g/m^2$ for obtaining the sufficient absorption of the solvent component of the ink and for obtaining the necessary surface smoothness of the layer. The method of coating and drying is not specifically limited. For the surface smoothness, a smoothening treatment such as supercalendering is preferably conducted as the finishing step.

The coating liquid may contain an additive such as a dispersant, a thickening agent, a pH-adjusting agent, a lubricant, a fluidity modifier, a surfactant, an antifoaming agent, a water-proofing agent, a releasing agent, a fluorescent whitener, a UV absorber, and an antioxidant in an amount not to lessen the effect of the present invention.

The whiteness and the smoothness of the recording medium largely depend on the reflecting layer. Therefore, the surface of this reflecting layer preferably has a whiteness degree of not less than 87%, and a Bekk smoothness of not less than 400 seconds at the side of the finished recording medium on which the dye-fixing layer is provided.

On the other hand, the dye-fixing layer may be made of any material which satisfies the desired properties such as (1) high ink absorption rate without unnecessary ink running, (2) high print density and high color-developability, (3) high weatherability, and permits formation of a coating layer having a glossy surface.

Of the materials for the dye-fixing layer, preferred are aluminum pigments. One example thereof is an alumina hydrate represented by the general formula below.

$$Al_2O_{3-n}(OH)_{2n}\cdot mH_2O$$

where the symbol n represents an integer of 1, 2, or 3; the symbol m represents a number of 0-10, preferably 0-5; m and n are not 0 at the same time; $mH_2O$ represents a releasable water phase not participating formation of $mH_2O$ crystal lattice in many cases (m may be an integer or not an integer). The number m may become 0 (zero) when heating. The alumina hydrate can be produced by a conventional method such as hydrolysis of aluminum alkoxide or sodium aluminate as described in U.S. Pat. No. 4,242,271 and U.S. Pat. No. 4,202,870, or neutralization of an aqueous sodium aluminate solution with aqueous solution of aluminum sulfate, aluminum chloride, or the like as disclosed in Japanese Patent Publication No. 57-44605.

Rocek et al. reported that the porous structure of alumina hydrate depends on the deposition temperature, pH of the solution, the aging time, the added surfactant (Collect czech Chem Commun, vol. 56, pp. 1253-1262, 1991). Of the alumina hydrates, the pseudo-boehmite is known to include cilium-like ones and non cilium-like ones.

The alumina hydrate preferably has satisfactory coating properties without causing cracks or like defects for attaining the desired properties of transparency, glossiness, and fixability for the dye or a like colorant of the recording liquid as described above. From this point of view, as alumina pigments for constituting the ink-receiving layer, useful are the alumina hydrate selected from those produced by the above known processes, and commercial products such as Disperal HP 13 (trade name, produced by Condea Co.).

Other useful aluminum pigments are aluminum oxides. The useful aluminum oxide can be produced by a Bayer process in which bauxite, a natural mineral, is treated with hot caustic soda and calcining the resulting aluminum hydroxide; or can be produced by treating aluminum pellets by spark discharge in water and calcining the resulting aluminum hydroxide; or can be produced by decomposition of an inorganic aluminum salt (alums and the like).

The crystal structure of the aluminum oxide is known to transform from a gibbsite type or boehmite type oxide to a $\gamma$, $\sigma$, $\eta$, $\theta$, or $\alpha$ type oxide depending on the heat treatment temperature. Naturally, any aluminum oxide produced by any production process or of any crystal structure is useful in the present invention. Of these, a $\gamma$ crystal type of aluminum oxide is preferred in view of the ink absorbency and the transparency of the formed layer.

The aluminum pigment including the aluminum oxides and aluminum hydrates incorporated into the dye-fixing layer in the present invention has a BET specific surface area ranging preferably from 100 to 160 $m^2/g$. A specific surface area larger than 160 $m^2/g$ may cause decrease of the ink absorbency depending on the particle size of the pigment, whereas a specific surface area smaller than 100 $m^2/g$ may cause decrease of color density by light scattering. The aluminum pigment incorporated into the dye-fixing layer in the present invention has an average particle size ranging preferably from 100 nm to 1 μm. A average particle size smaller than 100 nm may lower the ink absorbency, whereas an average particle size larger than 1 μm tends to lower the glossiness: more preferably the average particle size ranges from 150 nm to 500 nm.

A binder may be used, as necessary, for formation of the dye-fixing layer of the recording medium of the present invention. The binder useful for the aluminum pigment includes water-soluble polymers such as polyvinyl alcohols and modified products thereof, starch and modified products thereof, gelatin and modified products thereof, casein and modified products thereof, gum arabic, and cellulose derivatives like carboxymethylcelluloses, hydroxyethylcelluloses, and hydroxypropylmethylcelluloses; synthetic resins such as conjugated diene copolymer latexes like SBR latexes, NBR latexes, and methyl methacrylate-butadiene copolymer latexes, functional group-modified polymer latexes, vinyl copolymer latexes like ethylene-vinyl acetate copolymers; polyvinylpyrrolidone; maleic anhydride polymers and copolymers; and acrylic ester copolymers. These binders may used singly or in combination of two or more thereof.

The mixing ratio of the alumina pigment to the binder ranges preferably from 5:1 to 15:1. Within this range of the amount of the binder, the mechanical strength of the ink-receiving layer is increased without cracking or dusting, and the suitable pore volume can be maintained in the dye-fixing layer formation process.

The coating liquid for formation of the dye-fixing layer may contain, as necessary, an additive such as a dispersant, a thickening agent, a pH-adjusting agent, a lubricant, a fluidity modifier, a surfactant, an antifoaming agent, a water-proofing agent, a releasing agent, a fluorescent whitener, a UV absorber, and an antioxidant in an amount not to impair the effect of the present invention.

The dye-fixing layer contains the above-mentioned aluminum pigment at a ratio of preferably not lower than 70 mass %, more preferably not lower than 80 mass %, although the aforementioned white pigment may be mixedly used. Outside the above range, the formed image quality may be not comparable to silver salt photographs.

The dye-fixing layer of the recording medium of the present invention can be formed by applying a liquid dispersion containing the above-mentioned aluminum pigment onto a base material using a coating machine and drying it. The coating method is not specifically limited, including coating with a blade coater, an air knife coater, a roll coater, a curtain coater, a bar coater, a gravure coater, a die coater, and a sprayer.

The amount of application of the coating liquid in the dye-fixing layer formation, depending on the coating weight of the reflecting layer, is preferably not more than 30 $g/m^2$, more preferably in the range from 15 to 30 $g/m^2$, still more preferably from 15 to 25 $g/m^2$ in terms of the dry solid matter, in order to obtain higher fixing ability of the dye or a like coloring component of the recording liquid and to obtain higher smoothness of the dye-fixing layer. The dye-fixing layer may be subjected to baking, if necessary, after the layer formation. By controlling the dry coating weight within the above range in the dye-fixing layer formation, the time for color stabilization is sufficiently shortened, and sufficient ink absorbency and sufficient color developability can be achieved in combination with the aforementioned reflecting layer.

The surface of the dye-fixing layer is preferably treated for higher surface smoothness after the layer formation. The treatment can be conducted satisfactorily by a casting method in which the formed layer in a wet state is brought into pressure-contact with a smooth face of a heated mirror-finished drum or the like. The casting treatment includes direct methods, gelation methods, and rewetting methods. In the direct method, the surface of the coating layer just formed in a wet state on a base material is brought into pressure-contact with a heated mirror-finished drum for drying. In the gelation method, the surface of the coating layer just formed in a wet state on a base material is brought into a gelling agent bath to cause gelation, and subsequently the layer surface is brought into pressure contact with a heated mirror-finished drum for drying. In the rewetting method, the formed coating layer is wetted again by application of hot water or the like, and subsequently the layer surface is brought into pressure contact with a heated mirror-finished drum for drying. In the present invention, the coating mixture for the dye-fixing layer is applied onto a base material and dried in a conventional manner to form a layer for the fixing layer, the layer is wetted again by application of hot water or the like, and subsequently the layer surface is brought into pressure contact with a heated mirror-finished drum for drying.

The recording medium thus prepared in the present invention is adjusted to have a recording face glossiness of not less than 20% as measured at 20°. The glossiness in the present invention is measured according to JIS-Z-8741. Conventionally, the glossiness of the recording medium is measured at 75° or 60°. However, the recording medium which has a sufficient glossiness at 75° or 60° needs further improvement in texture and glossiness to be comparable to silver salt photographs. This is because the glossiness of such a recording medium is not sufficient at the actual observation angles. The inventors of the present invention noticed the importance of the glossiness measured at 20° in evaluation of glossiness and texture to be comparable to silver salt photographs.

The pigment (A) and the pigment (B) produce the effects of the present invention presumably by the mechanism below.

(1) The reflecting layer is mainly constituted of the pigment (B) which is hardly affected in its particle shape and the reflectivity by absorption of moisture or by contact with the ink. Thus the recording medium keeps the surface smoothness of the recording medium even after reception of the ink with its high reflectivity maintained at the interface with the transparent dye-fixing layer.

(2) However, single use of the pigment (B) may produce adverse effects of swelling of the base material and waving of the recording medium owing to the less liquid-absorbency (solvent retaining property) of the pigment (B) and resulting in penetration of the solvent into the fibrous base material.

(3) Use of the pigment (A) improves the liquid absorbency of the reflecting layer itself to obtain the higher ink absorbency. Thereby, the dye-fixing layer can be made thinner to improve the production efficiency and to decrease the production cost.

(4) The particles of the pigment (A) are smaller in size than the particles of the pigment (B). Therefore, the pigment (A) enters the interspace of the particles of the pigment (B) and causes swelling to hold the solvent and to retain the shape of the reflecting layer. On the contrary in the case where the pigment (A) has a larger particle size than the pigment (B) as described in Japanese Patent Application Laid-Open No. 2001-10222, the particles of the pigment (A) that have absorbed the solvent swell by themselves to lose the above effect (1).

(5) Furthermore, the reflecting layer, which has a high liquid absorbency, retards penetration of the solvent into the fibrous base material thereby preventing swelling of the base material and preventing waving of the printed portion of the recording face.

(6) The presence of the smaller particles of the pigment (A) in the interspace of the particles of the pigment (B) improves the surface smoothness of the reflecting layer, and consequently gives higher smoothness of the dye-fixing layer formed on the reflecting layer.

The casting treatment in the production process of the recording medium of the present invention by the rewetting method increases the above effects. In that treatment, the reflecting layer also prevents the swelling of the fibrous base material in formation of the dye-fixing layer (especially in the rewetting treatment with water), whereby the surface of the dye-fixing layer is smoothened more effectively.

In the present invention, the high ink performance and the high surface glossiness of 20% at 20° can readily be achieved by the constitution of the dye-fixing layer containing a specific particulate alumina hydrate and by the specific casting treatment. This is explained below in detail.

The particulate alumina hydrate used for the dye-fixing layer of the present invention is preferably of a plate-like shape having an average aspect ratio of 1-4. Fibrous particles having large aspect ratios tend to orient in a direction parallel to the base material surface in coating. On the other hand, plate-shaped particles less tend to orient in one direction in coating, forming an ink-receiving layer having a relatively large pore volume. The average aspect ratio herein is determined by dividing the major axis diameter of the particle by the minor axis diameter thereof. In contrast, spherical particles like colloidal silica are arranged in a nearly closest packing state, giving a smaller pore volume.

The dye-fixing layer constituted mainly of alumina hydrate (alumina hydrate layer) can be suitably treated by a rewet-casting treatment in which the formed layer is rewetted with water and the rewetted alumina hydrate layer surface is brought into pressure-contact with a heated mirror-finished drum to be dried. In order to obtain a desired glossiness by the rewet-casting treatment, the alumina hydrate is preferably in a plate shape having less orienting tendency. The structure of random assemblage of partially oriented particles of plate-shaped alumina hydrate takes rapidly the applied water into the interstice thereof in the rewetting process even if the water is applied in a small amount to readily cause swelling of the ink-receiving layer and reorientation of the crystals. Thereby, the layer surface is effectively smoothened on pressure-contact with heated mirror-finished drum for drying. With this structure, the alumina hydrate layer can be rewetted with a smaller amount of water, which decreases the vapor penetrating to the reverse face in the pressure-contact drying and enables use of the fibrous base material having a dense reflecting layer of the present invention. The combination of the above effects enables formation of the recording medium having a high glossiness with less light scattering on the recording face. Further, the random orientation of the particles prevents collapse of pores of the alumina hydrate layer on pressure-contact with the mirror-polished face, giving a recording medium having a high ink-absorbency.

On the other hand, fibrous particles, which have a larger aspect ratio and orient in parallel, are not readily swollen by adhesion of water on the surface, and do not readily causes rearrangement of the crystals. Therefore the layer constituted of such particles cannot readily be smoothened effectively. Naturally the layer can be swollen to some extent by application of a large amount of water at one time. In this case, however, the larger amount of water should be evaporated from the reverse face of the base material. Therefore, a dense base material may make the drying insufficient. In any case, desired sufficient glossiness of the alumina hydrate layer surface cannot readily be obtained. Furthermore, the orientation of the particles in a parallel direction decreases the pore volume of the alumina hydrate layer and is liable to cause collapse of the pores on pressure contact, making it difficult to obtain a sufficient ink absorbency.

In the case where spherical particles are used, the particles are packed in a closest packing state. The layer hardly swells by application of water, and the glossiness will not be increased by the pressure-contact drying, and the ink absorbency is not improved. As explained above, in the present invention, the desired effect can be achieved by combination of the specific alumina hydrate particles and the rewet-casting treatment.

In the present invention, the specific reflecting layer prevents the swelling of the fibrous base material in the rewetting process, whereby the smoothening treatment can be conducted effectively. The high glossiness of 20% or higher at 20° can be achieved by the synergistic effect explained above.

Known aqueous inks are useful for image formation on the recording medium of the present invention. In the present invention, in particular, the inks are preferred which contains an anionic compound such as water-soluble dyes having an anionic group. The water-soluble dye therefor includes water-soluble direct dyes, acid dyes, and reactive dyes containing an anionic group such as a sulfonic group and carboxyl group. Such a water-soluble dye is contained in conventional inks at a content ranging from about 0.1 to about 20 mass %. In the present invention, the content of the ink may be within this range. The solvent for the aqueous ink used in the present invention is preferably a mixed solvent composed of water and a water-soluble organic solvent: particularly suitable are mixed solvents composed of water and a water-soluble organic solvent which contain a polyhydric alcohol as the water-soluble organic solvent for preventing drying of the ink.

The ink-jet system for image formation is not specifically limited, and includes piezoelectric systems, heating element systems.

EXAMPLES

The present invention is described below specifically by reference to examples without limiting the invention.

Production Example

Aluminum pigments are prepared for use for the dye-fixing layer as below.

(Aluminum Pigment I)

Aluminum octaxide was synthesized and was hydrolyzed to obtain an alumina slurry according to the method described in U.S. Pat. Nos. 4,242,271 and 4,202,870. To this slurry, water was added to adjust the alumina hydrate solid matter content to 5 mass %. The diluted slurry was heated to 80° C. and was aged for 10 hours. After the aging reaction, the slurry was spray-dried to obtain particles. The particles were mixed with pure water, and hydrochloric acid was added thereto to adjust the pH of the liquid to 4. The mixture was stirred for a short time, and small components were removed by ultrafiltration, and treated for desalting. Then the mixture was deflocculated by addition of acetic acid. The colloidal sol after the deflocculation was dried. The obtained particles had a pseudo-boehmite structure according to X-ray diffraction measurement. Thus Aluminum Pigment I was prepared.

(Aluminum Pigment II)

The spray-dried particles obtained above were baked in an oven at 500° C. for 2 hours. The baked product was γ-crystalline alumna according to X-ray diffraction. The obtained particles were dispersed in pure water at a concentration of 20 wt % by use of acetic acid as a dispersant. The dispersion was treated with a ultrasonic dispersion machine for 60 minutes. Coarse particles were removed therefrom by centrifugation to obtain Aluminum Pigment II.

Pigments below were provided as Pigment (A) for the reflecting layer formation.

(Pigment A-1)

A commercial alumina hydrate dispersion, Dispal 23N4 (trade name, produced by Condea Co.): A liquid dispersion of alumina hydrate having an average particle size of about 0.1 μm. This was used without treatment.

(Pigment A-2)

A commercial particulate aluminum oxide, AKP-G015 (trade name, produced by Sumitomo Chemical Co.), was subjected to dispersion treatment in the same manner as the above Aluminum Pigment II to obtain γ-crystalline alumina having an average particle size of 0.24 μm. This was used as the fine particulate Pigment A-2.

Example 1

A coating layer containing two pigments shown below was formed on a fibrous base material having a basis weight of 150 $g/m^2$ and a Stökigt sizing degree of 200 seconds.

Barium sulfate as Pigment (B) was prepared by reaction of sodium sulfate and barium chloride. The obtained barium sulfate had an average particle size of about 1.5 μm and a refractive index of 1.65. A coating liquid was prepared by blending 50 mass parts of the above barium sulfate, 50 mass parts (in terms of solid matter) of the aforementioned Pigment A-1, 10 mass parts (in terms of solid matter) of an aqueous gelatin solution, 3 mass parts of polyethylene glycol, and 0.2 mass part of chromium alum. This coating liquid was applied onto the above-described base material in an amount of dry coating weight of 15 $g/m^2$ to form a reflecting layer followed by calendering.

Separately, polyvinyl alcohol, PVA117 (trade name, produced by Kuraray Co.) was dissolved in pure water to obtain a 9 mass % solution. The aforementioned colloidal sol of Aluminum Pigment I was concentrated to obtain a 17 mass % liquid dispersion. This dispersion of Aluminum Pigment I and the polyvinyl alcohol solution were mixed and stirred at a solid matter mass ratio of 10:1 to prepare a coating liquid for dye-fixing layer formation.

This coating liquid for dye-fixing layer formation was applied onto the above-formed coating layer (reflecting layer) by die coating to form a coating layer for dye-fixing layer formation in a dry thickness of 15 $g/m^2$.

The surface of this coating layer was subjected to rewet-casting treatment with a hot water (80° C.) by a rewet-casting coater to prepare a Recording Medium 1 of the present invention.

Example 2

A coating liquid for the reflecting layer was prepared in the same manner as in Example 1 except that 30 mass parts of the barium sulfate and 70 mass parts (in terms of solid matter) of Pigment A-2 were used. This coating liquid was applied in a dry coating weight of 20 $g/m^2$ to form a reflecting layer. The formed layer was calendered in the same manner as in Example 1. Then a coating layer for a dye-fixing layer was formed in the same manner as in Example 1 except that Aluminum Pigment II was used in place of Aluminum Pigment I and the dried coating thickness was changed to 20 $g/m^2$. This layer was subjected to the same casting treatment as in Example 1 to prepare Recording Medium 2 of the present invention.

Example 3

Recording medium 3 was prepared in the same manner as in Example 1 except that, as Pigment (B), commercial silica, Nipsil (trade name, produced by Nippon Silica Kogyo K.K.) having an average particle size of 2.8 μm was used in place of the barium sulfate.

Example 4

Recording medium 4 was prepared in the same manner as in Example 1 except that the ratio of the two pigments were changed to 70 mass parts of barium sulfate and 30 mass parts of Pigment A-1.

Comparative Example 1

Recording medium 5 for comparison was prepared in the same manner as in Example 1 except that Pigment A-1 was not used and the amount of the barium sulfate was changed to 100 mass parts.

Comparative Example 2

Recording medium 6 for comparison was prepared in the same manner as in Example 2 except that Pigment A-2 was not used and the amount of the barium sulfate was changed to 100 mass parts.

Comparative Example 3

Recording medium 7 for comparison was prepared in the same manner as in Example 1 except that the layer containing two pigments were not formed on the fibrous base material, only the coating layer for the dye-fixing layer was formed in a dry coating weight of 15 g/m$^2$. The formed layer was subjected to casting treatment in the same manner as in Example 1.

Comparative Example 4

Recording Medium 8 for comparison was prepared in the same manner as in Comparative Example 2 except that the casting treatment was not conducted.

Evaluation

Recording Mediums 1-8 were evaluated according to the evaluation methods as below. Table 1 shows the evaluation results.

On the recording medium, an image was formed on the recording medium by an ink-jet type photographic printer, BJ F850 (trade name, manufactured by Canon K.K.). The printed recording medium was evaluated for three characteristics: ink absorbency, waviness of the printed portion, and surface glossiness. Several photographic images were formed, and were printed in the highest print quality mode with the aforementioned printer. The evaluation was overall made by observation of the image-printed portions: composite black portion, leaf green portion, and sky blue portion.

The ink absorbency was evaluated by visually examining the occurrence of beading. No beading observed in composite black portions where the inks are applied in a largest amount was evaluated as “A”. Beading observed in composite black portions but no beading observed in leaf green portions and sky blue portions was evaluated as “B”. The rest was evaluated as “C”.

The waviness in the printed portion was similarly evaluated by visually examining the occurrence of waving. No waving observed in composite black portions where the inks are applied in a largest amount was evaluated as “A”. Waving observed in composite black portions but no waving observed in leaf green portions and sky blue portions was evaluated as “B”. The rest was evaluated as “C”.

The glossiness at 20° of the recording medium sheet before printing was measured according to JIS-Z-8741.

TABLE 1

| | Recording medium | Ink absorbency | Waviness | Glossiness |
|---|---|---|---|---|
| Example | | | | |
| 1 | 1 | A | A | 28% |
| 2 | 2 | A | A | 25% |
| 3 | 3 | A | A | 28% |
| 4 | 4 | A | A | 27% |
| Comp. Example | | | | |
| 1 | 5 | C | A | 25% |
| 2 | 6 | C | A | 24% |
| 3 | 7 | C | C | 15% |
| 4 | 8 | A | B | 8% |

The recording medium of the present invention does not cause waviness on the surface at high-density record portions even when used in full-color ink-jet recording, in particular photographic ink-jet recording using a large amount of inks, giving clear print images comparable to silver salt type photography owing to sufficient ink absorbency of the recording medium.

According to the present invention, the above object can be attained with a thinner ink-receiving layer, so that the recording sheet can be produced efficiently.

What is claimed is:

1. An ink-jet recording medium having at least a light-reflecting layer and a dye-fixing layer formed in this order on a base material in a multilayer structure, wherein the light-reflecting layer contains two or more pigments different in chemical composition, wherein the pigments comprise a pigment (A) having a highest liquid absorbency in the pigments and a pigment (B) having a lowest liquid absorbency in the pigments, and wherein the pigment (A) has an average particle size of not larger than 0.5 μm, and the pigment (B) is barium sulfate which has an average particle size ranging from 1.5 μm to 10 μm.

2. The recording medium according to claim 1, wherein pigment (B) has an average particle size ranging from 1.5 μm to 5 μm.

3. The recording medium according to claim 1, wherein the light-reflecting layer is directly formed on the base material.

4. The recording medium according to claim 1, wherein the pigment (A) is an aluminum pigment.

5. The recording medium according to claim 1, wherein the dye-fixing layer serves as a recording face and has a 20°-glossiness of not lower than 20%.

6. The recording medium according to claim 1, wherein the dye-fixing layer comprises not less than 70 mass percent alumina hydrate particles.

* * * * *